United States Patent
Pati et al.

(10) Patent No.: US 10,939,349 B2
(45) Date of Patent: Mar. 2, 2021

(54) METHOD AND APPARATUS TO CONFIGURE ACCESS POINTS IN A HOME NETWORK CONTROLLER PROTOCOL

(71) Applicant: ARRIS Enterprises LLC, Suwanee, GA (US)

(72) Inventors: Satya Prakash Pati, Bangalore (IN); Krishna Prasad Panje, Bangalore (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 16/193,980

(22) Filed: Nov. 16, 2018

(65) Prior Publication Data
US 2020/0162986 A1 May 21, 2020

(51) Int. Cl.
| | |
|---|---|
| *H04W 36/24* | (2009.01) |
| *H04W 36/08* | (2009.01) |
| *H04W 36/38* | (2009.01) |
| *H04W 88/16* | (2009.01) |
| *H04W 84/12* | (2009.01) |

(52) U.S. Cl.
CPC ......... *H04W 36/245* (2013.01); *H04W 36/08* (2013.01); *H04W 36/385* (2013.01); *H04W 84/12* (2013.01); *H04W 88/16* (2013.01)

(58) Field of Classification Search
CPC .... H04W 36/245; H04W 36/08; H04W 88/16
See application file for complete search history.

(56) References Cited

U.S. PATENT DOCUMENTS

| | | | |
|---|---|---|---|
| 10,361,913 B2* | 7/2019 | Ponnuswamy | H04L 41/16 |
| 2015/0223160 A1* | 8/2015 | Ho | H04W 48/20 370/338 |
| 2015/0312131 A1* | 10/2015 | Ganu | H04W 76/10 709/220 |
| 2017/0272336 A1* | 9/2017 | Johnstone | H04L 43/04 |
| 2017/0344702 A1* | 11/2017 | Shah | G16H 10/60 |
| 2017/0347295 A1* | 11/2017 | Rune | H04W 36/0033 |
| 2017/0357662 A1* | 12/2017 | Knany | G06K 9/00771 |
| 2018/0227176 A1* | 8/2018 | Ponnuswamy | H04L 41/0816 |
| 2018/0284737 A1* | 10/2018 | Cella | G06N 3/088 |
| 2018/0351786 A1* | 12/2018 | Pope | H04L 67/10 |
| 2019/0053114 A1* | 2/2019 | Karimli | H04W 36/14 |
| 2019/0205785 A1* | 7/2019 | Volk | G06N 5/04 |
| 2020/0068440 A1* | 2/2020 | Talbert | H04W 36/22 |

* cited by examiner

*Primary Examiner* — Deepa Belur
(74) *Attorney, Agent, or Firm* — Wenderoth, Lind & Ponack, L.L.P.

(57) ABSTRACT

A content streaming apparatus, method, and computer readable media steer a client device to from one wireless access point to another based on usage history of the client device. A controller is configured to establish a wireless streaming session between one or more access points and one or more client devices. An initial profile category is assigned by one or more access point to the client device based on one or more profile categories. A self-learning algorithm is executed to collect usage data of the client device and store the usage to create a usage history profile for the client device. The controller provides instruction to steer the client device to one of the access points based on the usage history profile of the client. Preferably, the content streaming apparatus is a home network controller. From the software/client end a steering app is downloadable to the client device for executing software associated with the self-learning algorithm.

17 Claims, 6 Drawing Sheets

METHOD AND APPARATUS TO CONFIGURE ACCESS POINTS IN A HOME NETWORK CONTROLLER PROTOCOL

FIELD OF THE INVENTION

This disclosure relates to methods and apparatus to configure access points and steer a client to an access point based on the client's profile.

BACKGROUND

Network management and control plane stacks are provided as network solutions for homes, offices, and/or businesses to enable Wi-Fi management. Generally, the network is composed of a Home Network Controller ("HNC"), Home Network Extender ("HNE") protocol server, and protocol stack. The term HNC could also refer to a "MultiAP Controller" and HNE could refer to "agent," as per Wi-Fi Alliance. The HNC runs on a residential gateway in the home or business. It implements band steering, basic service set (BSS) steering, access point (AP) steering, client steering, airtime fairness, and dynamic channel selection. The HNE protocol server runs on the gateway and HNE clients run on subordinate wireless access points. The HNE protocol enables discovery of new access points, synchronizing Wi-Fi configuration, and transmitting statistical information used to determine steering actions.

Typically, network communication environments and/or HNCs do not have specific detailed profiles created and maintained for each client device based on usage. Any client in the HNC must adhere to a profile created by an Access Point (AP), irrespective of AP usage and capability at a given time. While steering of clients has been carried out from gateway to extender, clients typically remain operating across the same AP. Continued use of the same AP frequently creates issues when multiple clients are accessing high data-intensive applications ("apps") or too many clients are connected to the same AP. Steering from the gateway to extender commonly results in lag time issues, for example, if all clients are operating under optimal data usage. Since HNCs are generally unaware of external APs in the region, the HNC is not capable of steering the client and/or of warning the client of forthcoming data usage pattern from other clients.

Conventionally, APs assign a general profile to all clients in the HNC and clients do not have any role to play when switched from the gateway to extender and/or from high-capacity bandwidth to limited bandwidth capacity. Hypothetically, if there are multiple clients accessing high bandwidth applications at same time, then a lag might be experienced by clients randomly.

In other cases, APs may restrict certain applications for a certain time of day, so that is a client wants to access an application, the client must manually connect to another network (e.g., another AP) to access the restricted sites, and again connect back manually. In some networks, certain APs create user profiles for clients and limit usage of clients based on the assigned profile level. As a result, clients don't have means to ensure seamless data streaming. For example, where mail access and streaming are only allowed in an office AP and the client needs to access other sites, a solution is required to freeze office mail apps along with office data and switch to other APs or switch to mobile data while accessing other apps or apps (unsecured sites). When the client wants to access office mail again, the client must switch back to office mail while unsecured apps are paused or terminated.

There exists a need in the art for methods and systems that intelligently create separate user profiles for each client AP connection. Further, there is also a need in the art to provide the ability to steer clients to different extenders, APs and/or to different channel bandwidths based on device usage statistics or other personalized user-based preferences.

SUMMARY

The present invention provides methods, systems, and computer readable media operable to intelligently configure APs within an HNC based on a client's profile determined from usage history. The invention provides a wireless gateway, preferably for within a network composed of an HNC, Home Network Extender HNE protocol server, and protocol stack for a residential gateway in the home or business. Wi-Fi performance, or signal strength, of client devices wirelessly connected to a station ("STA") or access point ("AP") through an HNE or gateway ("GW") are determined by gateway firmware, such as HNC, through a received signal strength indicator (RSSI) of conventional STA to AP or HNE association. Through implementation of a learning algorithm, clients having a poor (low RSSI) AP association, or that are using increased data, or specific data applications, are steered to a different AP that has more optimal throughput capacity, thereby improving wireless connectivity performance during increased data usage.

In a first aspect of the invention, a content streaming apparatus is provided or steering a client device to from one wireless access point to another based on usage history of the client device. The apparatus comprises a controller configured to establish a wireless streaming session between one or more access point and one or more client device. An initial profile category is assigned by one or more access points to the client device based on one or more profile categories. A self-learning algorithm is executed to collect usage data of the client device and create a usage history profile for the client device. The controller provides instruction to steer the client device to one of the access points based on the usage history profile of the client. Preferably, the content streaming apparatus is a home network controller. From the software/client end, a steering app is downloaded to the client device for executing software associated with the self-learning algorithm.

Another aspect of the invention is directed toward a method implemented by a content streaming apparatus for steering a client device to from one wireless access point to another based on usage history of the client device. The method comprises the steps of: 1) configuring a controller to establish a wireless streaming session between one or more access point and one or more client device; 2) assigning an initial profile category by one or more access point category to the client device; and 3) executing a self-learning algorithm to collect usage data of the client device and store the usage to create a usage history profile for the client device. The controller provides instruction to steer the client device to one of the access points based on the usage history profile of the client. The method also preferably comprises the step of downloading a steering app to the client device for executing software associated with the self-learning algorithm.

In another aspect of the invention, there is provided one or more non-transitory computer-readable media having instructions operable to cause one or more processors to perform the operations. The media has instructions operable to cause a content streaming apparatus to steer a client device to from one wireless access point to another based on usage history of the client device, comprising: configuring a controller to establish a wireless streaming session between one or more access point and one or more client device; assigning an initial profile category by one or more access point category to the client device; executing a self-learning algorithm to collect usage of the client device and store the usage to create a usage history profile for the client device; whereby the controller provides instruction to steer the client device to one of the access points based on the usage history profile of the client.

BRIEF DESCRIPTION OF THE DRAWINGS

The invention will be more fully understood, and further advantages will become apparent when reference is had to the following detailed description of the preferred embodiments of the invention and the accompanying drawings, in which.

DETAILED DESCRIPTION

Figure 1:
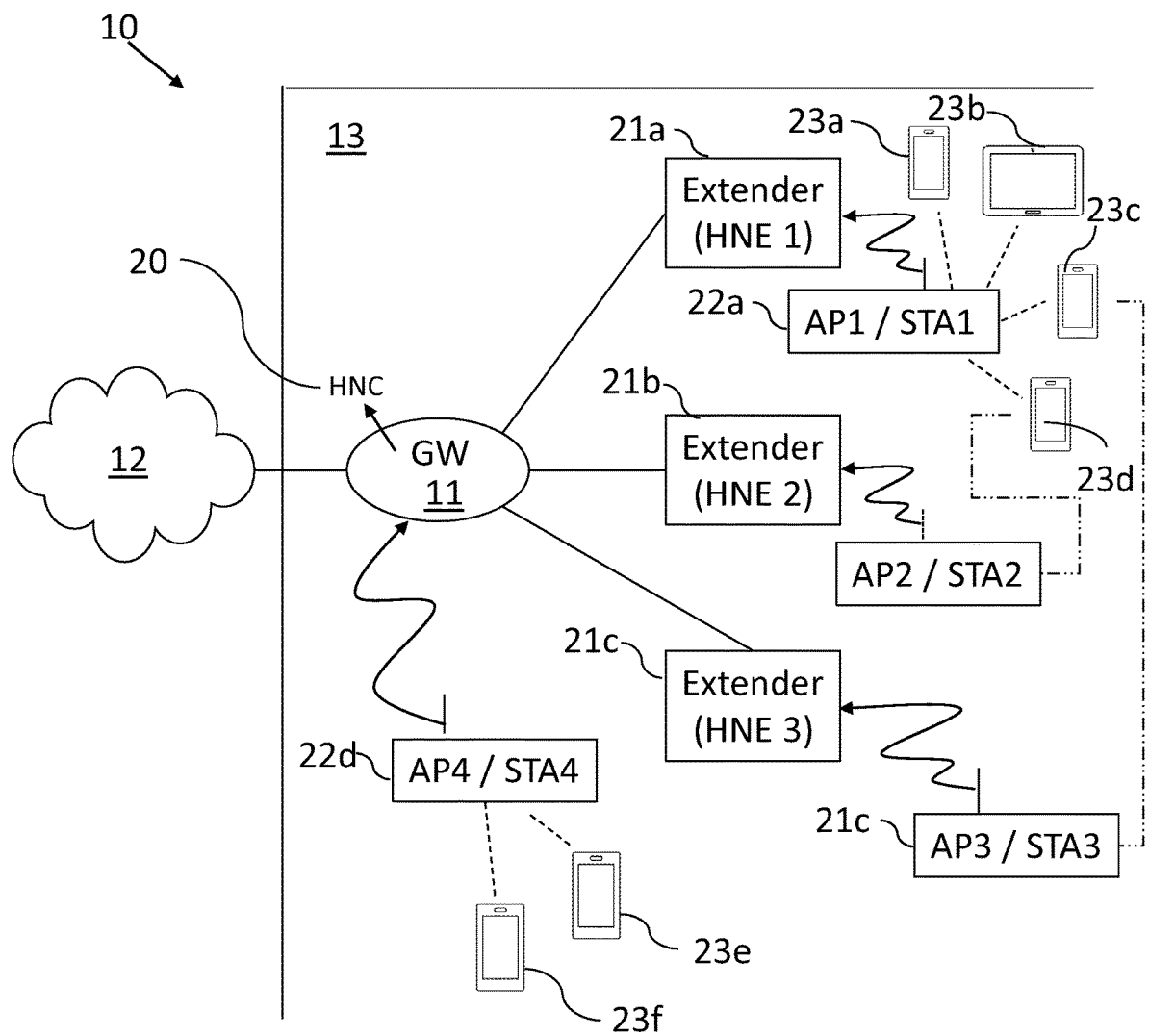
FIG. 1 shows a modified HNC environment implementing the subject configurable APs for client steering in a home, office, hospital, mall or commercial setting.

It is desirable to improve upon methods and systems for steering clients to optimal APs/STAs using usage data, both real-time and stored, that is collected and maintained on an HNC platform. The subject method and system are appointed to be implemented in communication network platforms, such as a home network controller (HNC) platform using usage statistics of client devices running on APs/STAs to steer clients to different extenders or APs/STAs. In one aspect of the subject system and method, the client device may be connected to a different AP/STA when it needs to connect to certain applications. In yet another aspect of the subject system and method, the HNC dynamically changes the channel bandwidth based on less privileged devices getting connected to the network.

Throughout this application, the term "user" is used, which generally herein refers to a client, the end user, consumer or television viewer receiving HNC or MSO services. As used herein the term gateway ("GW") refers generally to a data communication device that provides a remote network with connectivity to a host network, a device that routes traffic from a workstation to the outside network, an ISP that connects a user to the internet, and/or a proxy server and a firewall. Access Point ("AP") or wireless access point ("WAP") as used herein generally refers to a networking hardware device that permits a Wi-Fi device to connect to a wired network, typically connecting to a router (via a wired network) as a standalone device, or integral to the router itself. Station ("STA") as used herein generally refers to a station, receiver, and/or an AP communicating via a protocol, particularly the 802.11 protocol. Client as used herein refers generally to a computer, laptop, or smartphone, or any device communicating via the 802.11 protocol or operating over Wi-Fi.

The HNC environment provides applications and services delivered by way of an STA or personal mobile device. Traffic over Wi-Fi has increased exponentially and Video, both over-the-top and managed video, delivered over Wi-Fi makes network problems immediately visible to consumers. Coupled with mobile device usage, this has created greater demand for coverage, high performance, and high quality. Wi-Fi represents a huge challenge for operators, particularly troubleshooting Wi-Fi problems is difficult because the network is invisible and there are many sources of interference. As a result, long technical support calls, unnecessary truck rolls, and unnecessary equipment returns frequently occur. Increased use of Wi-Fi devices and corresponding Wi-Fi traffic has surpassed the capacity and coverage capabilities of many residential and commercial business gateways. The subject system and method provide advantages by steering clients to higher quality Wi-Fi, and thereby increasing customer satisfaction and reducing operational expenses. Software applications of the subject system and method are particularly adapted for integration with HNC components.

HNC in turn, is a component integrated within comprehensive Wi-Fi offerings that encompass software elements that reside on a Customer premises equipment (CPE), provide data collection, analysis, and policy optimization in the cloud, and assurance applications for operations personnel and mobile applications for subscribers to remotely manage, view, and troubleshoot Wi-Fi in the home. CPE components and applications provide network management and control plane stack for Wi-Fi management, and is composed of the HNC, HNE and CWMP protocol stack agent.

The subject method and apparatus to Configure APs as per Client's Profile, particularly having applications in the HNC scenario, provides a two-part solution, a GW solution and a client solution. The GW solution ensures that the AP creates a "self-learning" profile for each client or STA connected. As the client or STA is connected to an AP or extender, a self-learning algorithm is executed to develop a self-learning profile based on the usage of the client or STA. Each self-learning or usage profile is created based on a series of fields directed toward usage of the client and/or STA. For non-limiting example, the self-learning usage profile may be determined by the following parameters: a) Connection Start Time; b) Connection End Time; c) Time of High Intensive Applications and Bandwidth Used; d) Applications Allowed to Use; e) Applications Blocked in the AP; f) AP Profile Type assigned by AP; g) Mac ID; h) Type of Device; and/or i) Unique ID of the STA.

AP profiles and/or learning profiles assigned by history of usage of the STA preferably include categories, for example: Profile Type:→Guest, Homies, Hosts, Master. A default profile preferably is assigned as "Guest Profile→Visitors." Assigned Category 1-Homies→Friends. assigned Category 2-Hosts→Colleagues or Family Members. Assigned as Category 3-Master→Admin Privileges. Any client which gets created will have created a default profile (Guest), Master can change the privileges at any time. Category 1 and above profiles require "app/software download and login" at client side.

Each Profile creation is linked to a "learning algorithm" which monitors and enhances the profile structure by adding more categories. Based on the profile categories or learning algorithm, the system can determine which profile accesses how much data and at which time, data usage info. In turn, based on this information (data usage info), the GW can steer clients to other APs in the region, can inform the client profile to switch to the next best available AP, and/or switch on other data sources available.

Android/iOS app/software for clients is required for download by clients to facilitate HNC profile based steering modes. The HNC profile steering mode maintains the profile level assigned by different APs to the client and allows clients to switch from one AP to another based on the type of data-usage and bandwidth requirements. The client may be automatically switched, or in the alternative, the client may receive a prompt allowing the client to select whether to switch.

The steering app also maintains bandwidth, background sync data rates, and usage timing requirements for each app/process in the client mobile phone or client hardware and maintains the profile list assigned by the APs. Based on the app's requirements, historical data usage patterns, profile level assigned by AP and AP data usage forecast of other clients, the steering app/software can switch a client to the most optimal AP, or the next best AP. This switch can be set for a time period x, and/or based on a client's data usage requirements or any personalized user-based requirements. Upon completion of time period x and/or completion of the intense data usage requirements and/or fulfillment of personalized user-based condition, the steering app can switch the client back to the original AP, or to another AP. This switch can be automatic or can be set as a prompt inquiring permission from the client and/or requesting steering parameters.

Each app can also have recommended APs for specific use. For example, AP 1 may be designated for use for mail and/or skype, or designated as an "office AP", while AP 2 may be designated for other apps as a "home AP". In case any random AP is connected, the mail and skype apps can stop syncing or ask for manual permission or password, and/or direct the client to the designated AP, AP1 for example. Master privileges can be given to a client from the client software end, and the master privilege can provide the ability to overwrite AP and/or other client parameters.

FIG. 1 illustrates a modified HNC environment implementing the subject configurable APs for client steering in a home, office, hospital, mall or commercial setting, shown generally at 10. A Home Network Controller (HNC) 20 operates on a gateway (GW) 11 of the home, office, hospital, mall or business, shown generally at 13, in communication with a wide area network (WAN) 12. HNC 20 preferably utilizes CWMP protocol stack is implemented supporting TR-157 Amendment 10 and TR-181 Issue 2 Amendment 10 support for efficient bulk data transmission to the ECO Wi-Fi Cloud. Band steering, BSS steering, AP steering, client steering, airtime fairness, and dynamic channel selection is executed by the HNC 20. One or more Home Network Extender protocol (HNE) servers, herein shown as HNE1, HNE2, HNE 3 shown respectively at 21a, 21b, 21c, run on the GW 11 implementing the HNC 20 platform and software.

Subordinate wireless APs/STAs [AP1/STA1, AP2/STA2, AP3/STA3 . . . ] wirelessly run on the HNE servers 21a, 21c, shown generally at 22a, 22c. One or more APs/STAs may run directly on the GW or HNC platform, as shown at 22d. HNE clients via client devices (e.g., smartphones, tablets, etc.) run on the AP4/STA4 22d, and/or subordinate wireless APs/STAs 22a, 22c. HNE protocol enables synchronizing Wi-Fi configuration, and transmitting statistical information that can be used by the HNC 20 in determining steering actions. HNE protocol enables discovery of new APs (or STAs), such as for example, AP2/STA2 22b is shown discovered by HNE2, 21b. HNE Servers run on the gateway and HNE clients run on the subordinate wireless APs/STAs. Herein, client devices 23a, 23b, 23c and 23d are shown running on AP1/STA1 22a, which in turn runs via Wi-Fi on HNE1 21a, which in turn runs via LAN/Wi-Fi/MoCA on the GW 11 and HNC 20 platform. Client devices 23e, 23f are shown running on AP4/STA4, which in turn runs via Wi-Fi/LAN/MoCA on the GW 11 and HNC 20 platform.

HNE protocol implemented by the HNE servers 21a, 21b, 21c, are operable via the HNC 20, to synchronize Wi-Fi configurations of each of the APs/STAs and transmit the statistical information for use by the HNC 20 in determining steering actions. HNC 20 includes software and applications operable with the subject HNEs and APs/STAs steering platform for configurations and steering based on a "self-learning" profile for each client connected over the GW based on usage. Each AP/STA creates a "self-learning" profile for each client connected through the AP/STA. Alternatively, the "self-learning" profile is created and maintained by the HNC platform, and each AP/STA merely transmit information to the HNE and in turn HNC. As the client devices 23a-23f are connected to the AP and/or HNE, the self-learning algorithm is executed to develop a history profile based on usage of the client 23a-23f Each self-learning or usage profile is created based on a series of fields directed toward usage of the client and/or STA. For non-limiting example, the self-learning usage profile may be determined by the following parameters: a) Connection Start Time; b) Connection End Time; c) Time of High Intensive Applications and Bandwidth Used; d) Applications Allowed to Use; e) Applications Blocked in the AP; f) AP Profile Type assigned by AP; g) Mac ID; h) Type of Device; and/or i) Unique ID of the STA.

Steering based on usage history may be executed. This steering may be automatic based on the number of client devices running on a given AP/STA, the amount of data used, the type of data used, the time of day, etc., or may be manually run by a user via the client device when the client device begins to operate slowly or lag. Client devices 23a-23d are shown running on AP1/STA1 22a. The number of devices and/or the applications running on the devices (bandwidth used, time, apps, etc.) is maintained by AP1/STA1 22a and HNE1 21a and communicated to the HNC 20. As the devices are running, the self-learning algorithm determines usage history associated with each client device 23a-23f running on the GW 11, assigning a usage profile to each client device 23a-23f. Based on the usage profile, for example, client device 23d requires greater bandwidth, therefore the HNC 20 steers client device 23d to a more optimal AP/STA, herein AP2/STA2 shown generally at 22b. Additionally, client device 23c is lagging and, based on the usage self-learning algorithm is steered to a more optimal AP/STA, herein AP3/STA3 21c.

Figure 2:
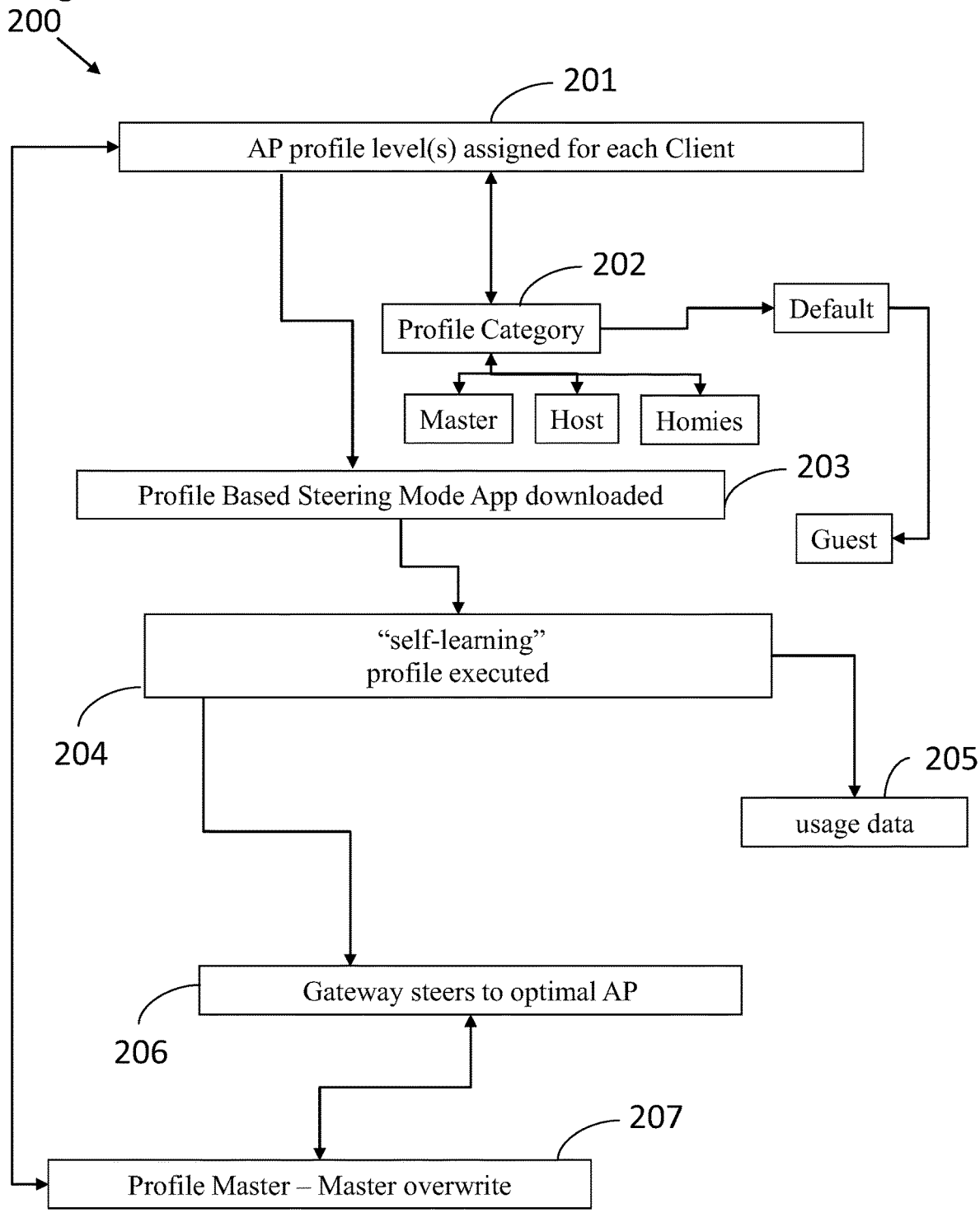
FIG. 2 is a flowchart illustrating the steps of an embodiment of the subject method and system executed through a gateway.

FIG. 2 is a flowchart illustrating steps of an embodiment of the subject method and system executed through a gateway, shown generally at 200. The subject method and apparatus to configure APs as per a client's profile and usage has particular applications in the HNC scenario and provides a two-part solution, a GW solution, and a client solution. The GW solution ensures that the AP creates a "self-learning" profile for each client or STA connected over the HNC. Each AP assigns an AP profile based on the history of usage. At 201 a profile level(s) is assigned by each Access Point(s) (AP1; AP2; AP3 . . . APn+1) for each Client [Client1, Client2, Client3 . . . Client(n+1)].

Profile category assignment is executed at 202. Profile category may include, for example, master, host, homies, with a default guest profile for visitors. For example: Profile Type:→Can be categorized as Guest, Homies, Hosts, Master. Default-Guests Profile→Visitors. Category 1-Homies→Friends. Category 2-Hosts→Colleagues or Family Members. Category 3-Master→Admin Privilege. Any client which gets created will have created a default profile (Guest), Master can change the privileges at any time. Category 1 and above profiles require "app/software download and login" at the client side. At 203, the profile Based Steering Mode App downloaded by Client(s) [Client1, Client2, Client 3, . . . Client(n+1)].

Each profile creation 201 is linked to a "learning algorithm" executed by the app which can monitor and enhance the profile structure by adding more categories and can then easily decide which profile accesses how much data and at which time. Learning Algorithm—AP "self-learning" profile is executed at 204 to establish steering profile/historical data usage patterns of Client 1; Client2-Client(n+1). Usage patterns monitored and maintained include, for example bandwidth, background sync data rates, usage timing requirements for each app/process, and AP1-Apn+1 assigned profile levels for Client1-Client(n+1), shown generally at 205. The "self-learning" profiles may include the following parameters for determining usage history: a. Connection Start Time; b. Connection End Time; c. Time of High Intensive Applications and Bandwidth Used; d. Applications Allowed to Use; e. Applications Blocked in this AP; f. Profile Type; g. Mac ID; h. Type of Device; and/or i. UniqueID.

Based on this information (data usage info), Gateways can steer clients to other Access Points in the region or can inform the client profile to switch to next best available AP or switch on other data sources available. At 206, the GW steers each Client1-Client(n+1) to optimal AP or to other data source(s). Profile mater can overwrite steering, shown at 207.

Figure 3:
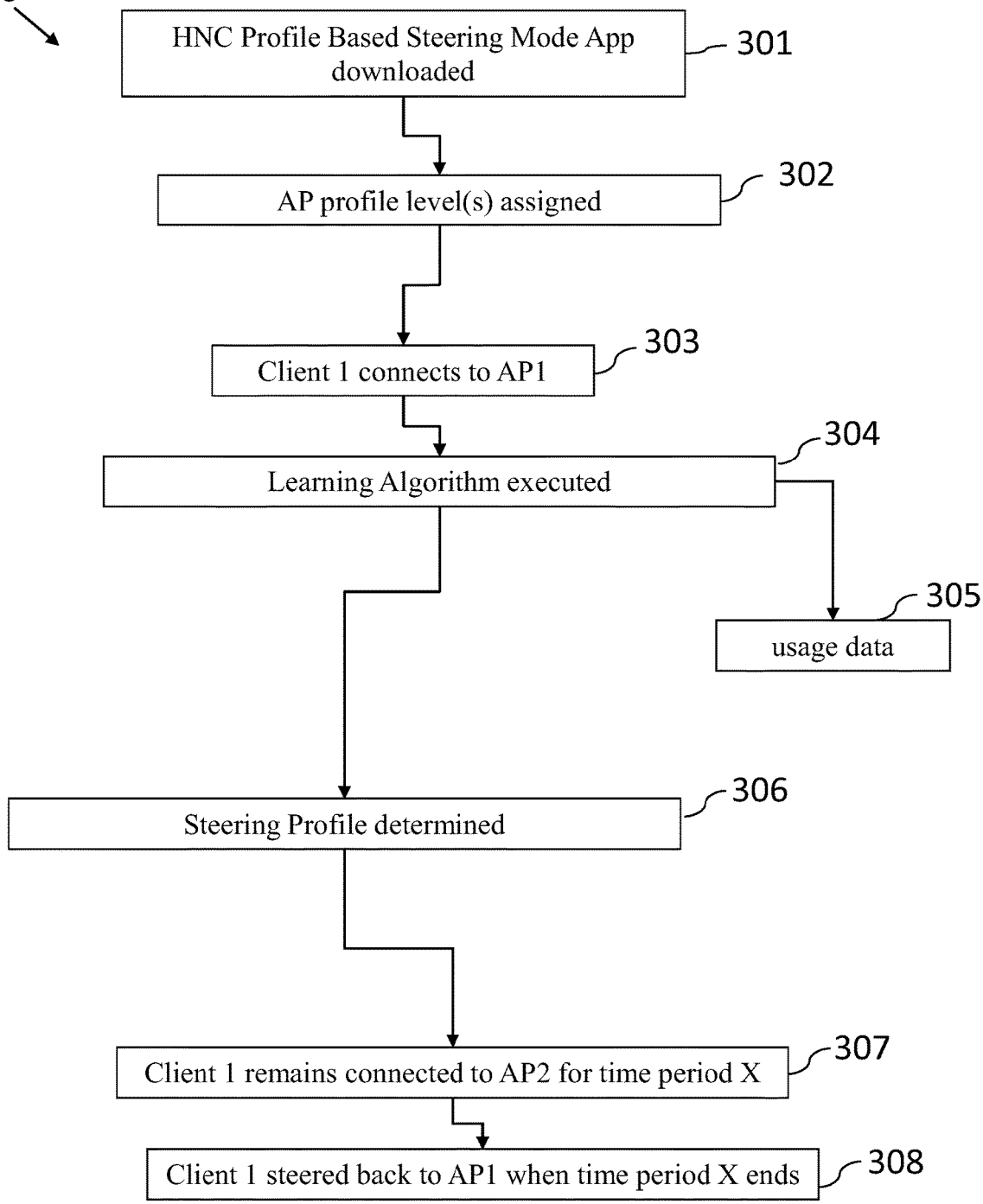
FIG. 3 is a flowchart illustrating the steps of an embodiment of the subject method and system executed through a client device.

FIG. 3 is a flowchart illustrating the steps of an embodiment of the subject method and system executed through a client device, shown generally at 300. At 301 the HNC Profile Based Steering Mode App downloaded by Client(s) [Client1, Client2, Client 3, . . . Client(n+1)]. An AP profile level(s) is assigned by different Access Point(s) (AP1; AP2; AP3 . . . APn+1) and maintained at 302. App/Software for Clients is provided for clients. This Android/iOS App is required to be downloaded by clients to facilitate HNC Profile based Steering Modes. This Profile maintains the profile level assigned by different Access Points to the client and allows clients to switch from one AP to another based on the type of data-usage and bandwidth requirements. The app also maintains bandwidth, background sync data rates, usage timing requirements for each app/process in the client mobile phone or client hardware, and the profile list of assigned by Access Points.

Even though the client remains connected to an AP with maximum signal strength but based on app's requirements and historical data usage patterns, profile level assigned by AP and AP's data usage forecast of other clients, client software can switch to next best AP for the time period it requires intensive data usage and then it switches back again. Also based on secure settings, each app can have recommended APs like for emails and skypes the recommended APs are "office AP" or "home AP." In case any random AP is connected, the mail and skype apps can stop syncing or ask for manual permission or password. The client software can have master privileges, and the master can overwrite Access Point and other client parameters. When a Client, herein Client 1, connects to an AP/STA, herein AP1, the steering app begins collecting usage data/history at 303. At 304, the Learning Algorithm—AP "self-learning" profile is executed to establish historical data usage patterns of Client 1; Client2 Client(n+1).

The learning algorithm collects and maintains usage data at 305. Usage data includes, for non-limiting example, bandwidth, background sync data rates, usage timing requirements for each app/process, and AP1-Apn+1 assigned profile level for Client1-Client(n+1). At 306 the steering profile is determined based on usage data. The steering profile may be determined based on App's requirements+historical data usage patterns+AP1's data usage forecast of Client1+AP1's data usage forecast of Client2-Client (n+1)=Profile based Steering switch to AP2 (next best AP). Based on the steering determination, the Client, herein, for example, Client 1 is steered to a more optimal AP/STA, AP2, and remains connected to AP2 for time period X at 307. At 308, Client 1 is steered back to AP1 when time period X ends. Time period X may end for example when the application is exited, or when less bandwidth is being used, and/or based on a set time of day (e.g., business hours; office app: email, etc.).

Figure 4:
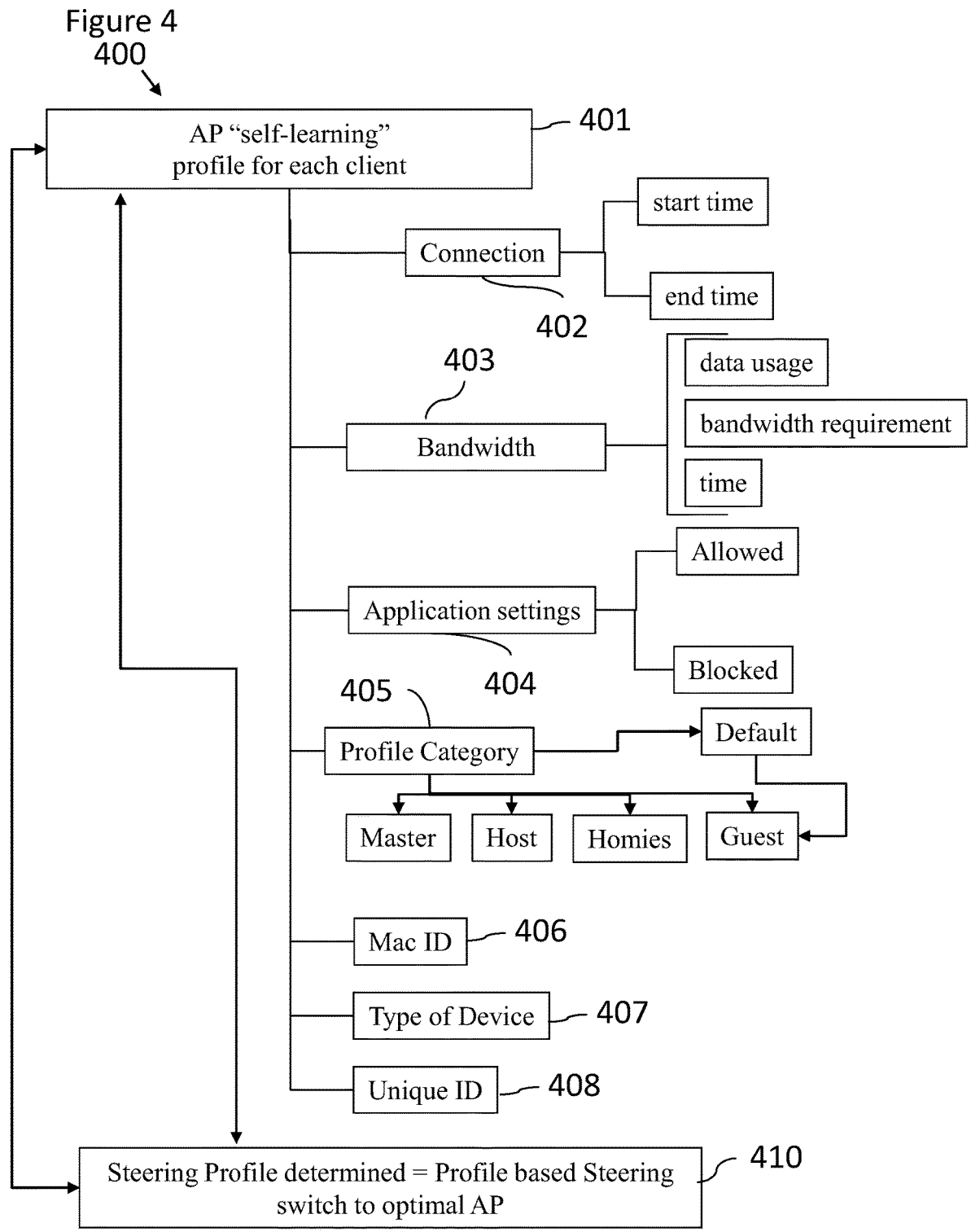
FIG. 4 is a flowchart illustrating the steps of an embodiment of the Learning Algorithm—AP "self-learning" algorithm implemented to create a self-learning profile for each client.

FIG. 4 is a flowchart illustrating steps of an embodiment of the Learning Algorithm—AP "self-learning" algorithm implemented to create a self-learning profile for each client, shown generally at 400. At 401 a learning algorithm is executed. The learning algorithm is a self-learning algorithm preferably collecting usage data through the AP/STA of each client device to determine a usage profile for each client device. This learning algorithm preferably collects information including connection 402 (start time: end time), bandwidth 403 (data usage, bandwidth requirement, time of day of usage), application settings 404 (allowed; blocked), profile category 405 of client or client device based on initially set-up parameters of the AP/STA, Mac ID 406, Type of Device 407, and unique ID 408 of the device. Based on these parameters, a steering profile is determined at 410. Based on this profile, the client is steered (automatically; or prompted) to an optimal/assigned AP/STA.

Figure 5:
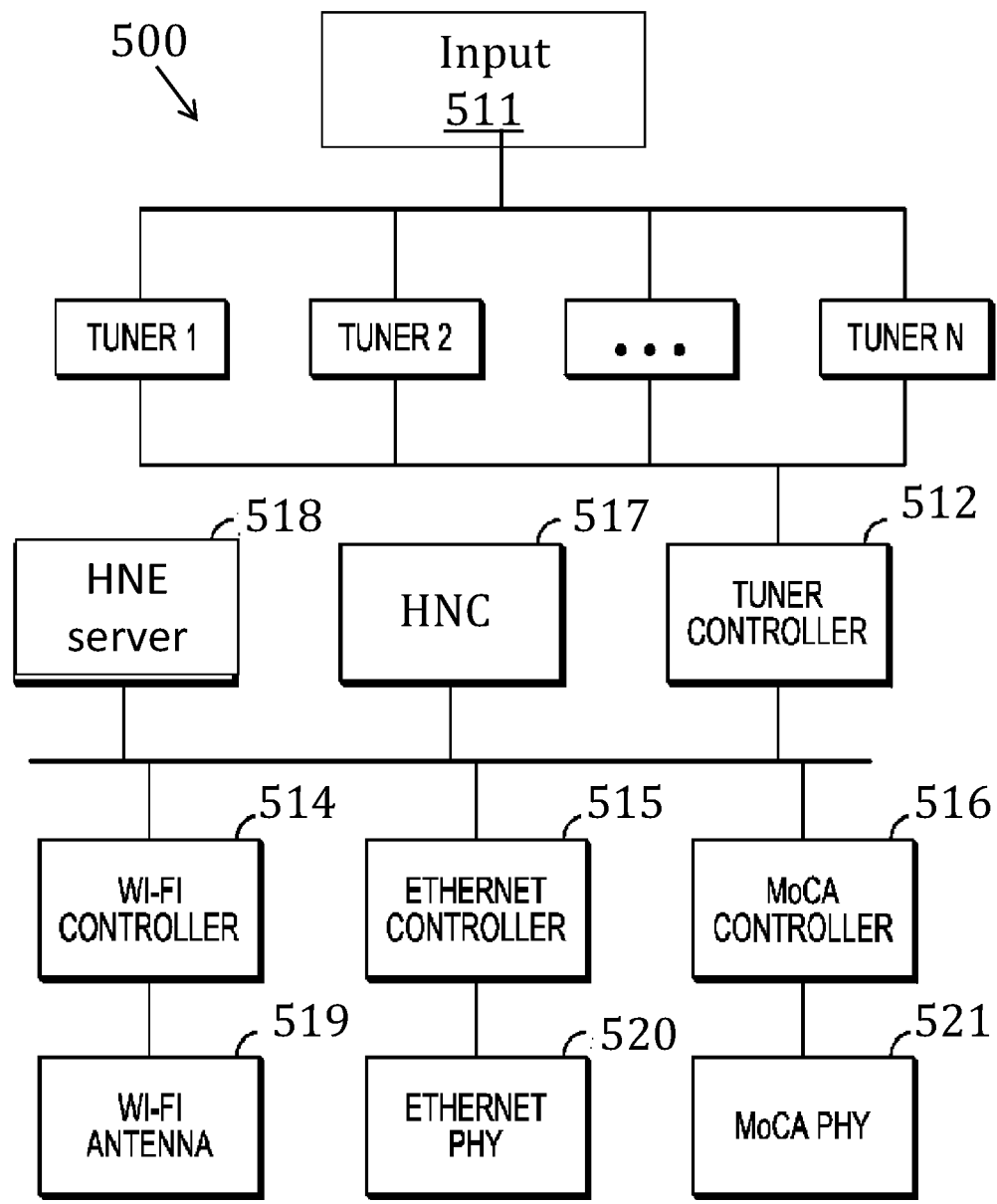
FIG. 5 shows an example of a gateway device and HNC of the present invention.

FIG. 5 shows an example of a gateway device and HNC of the present invention, shown generally at 500. The gateway device is a content streaming apparatus that is a gateway to content, data, and any information accessible through signals on input 511. The input 511 may be an RF input that connects to a content provider, such as a television program provider, by the terrestrial antenna, satellite dish, or wired cable. The gateway device includes a plurality of tuners, Tuner 1, Tuner 2, . . . Tuner N, each of which selectively tunes to a requested frequency or channel of content. A Tuner Controller 512 controls each tuner to tune to an instructed frequency or channel. The Tuner Controller 512 also determines whether an unused tuner is available, and if so, reserves a tuner as a destination tuner during a transfer of a streaming session from another gateway device.

The gateway device includes one or more HNE 518 server, which could be implemented by an integrated circuit or circuits or by a processor, that converts content signals from the tuners to appropriate signals for wireless (e.g., Wi-Fi or LTE) transmission via the wireless controller 514 and wireless antenna 519. The gateway device includes an Ethernet controller 515 and/or a MoCA controller 516 by which the gateway device can be networked with other gateway devices, or any other networking capable device. The Ethernet controller 515 and the MoCA controller 516 interface to the network via the Ethernet PHY (physical transceiver) 520 and MoCa PHY (physical transceiver) 521, respectively.

The gateway device also includes a Gateway Steering Controller (GSM) or HNC 517, which monitors streaming sessions on all of the gateway devices in the network and monitors the signal strength of the client devices. The gateway device can be in the form of a so-called "set-top box," AP, extender AP, etc., or may be built into a television or other media content playing apparatus.

Figure 6:
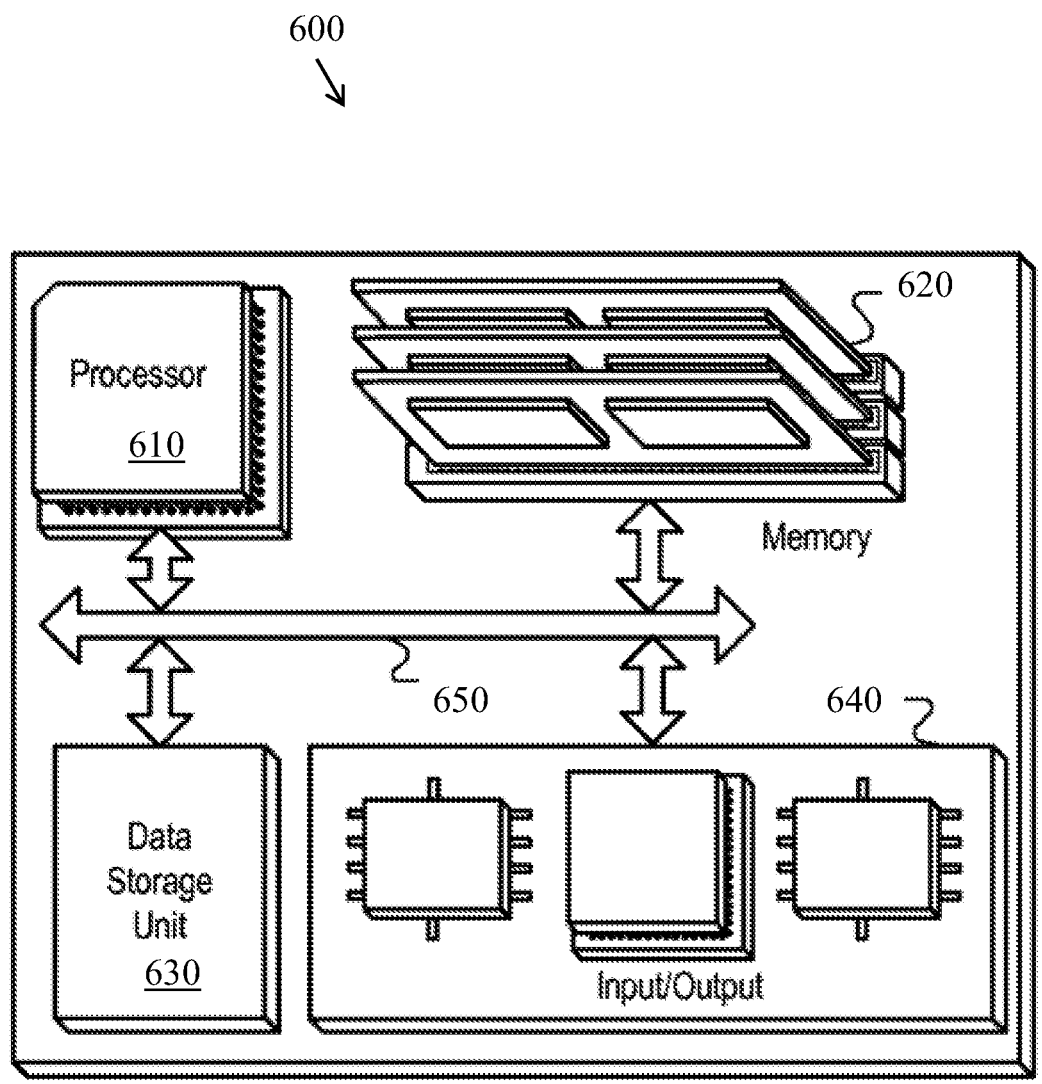
FIG. 6 is a block diagram of a hardware configuration operable to facilitate the initiation of the subject method and system.

FIG. 6 is a block diagram of a hardware configuration operable to facilitate the initiation of the subject method and system, such as for a set top box or AP/STA, shown generally at 600. The hardware configuration can include a processor 610, a memory 620, a storage device 630, and an input/output device 640. Each of the components 610, 620, 830, and 6 can, for example, be interconnected using a system bus 650. The processor 610 can be capable of processing instructions for execution of the subject method, system and computer readable media within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630. The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit. In some implementations, the storage device 630 can be capable of providing mass storage for the hardware configuration 600. In one implementation, the storage device 630 can be a computer-readable medium. In various different implementations, the storage device 630 can, for example, include a hard disk device, an optical disk device, flash memory or some other large capacity storage device.

In other implementations, the storage device 630 can be a device external to the hardware configuration 600. The input/output device 640 provides input/output operations for the hardware configuration 600. In one implementation, the input/output device 640 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 602.11 card), and/or one or more interfaces for outputting video and/or data services to a CPE device (e.g., access point, cable modem, router, wireless extender, or other access device) or subscriber device (e.g., set-top box/station, etc.). In another implementation, the input/output device can include driver devices configured to send communications to, and receive communications from one or more networks (e.g., WAN, local network, cloud, headend/cloud controller, etc.).

Those skilled in the art will appreciate that the invention improves upon methods and systems for steering clients to optimal APs/STAs based on usage history. The subject matter of this disclosure, and components thereof, can be realized by software instructions that upon execution cause one or more processing devices to carry out the processes and functions described above. Such instructions can, for example, comprise interpreted instructions, such as script instructions, e.g., JavaScript or ECMAScript instructions, or executable code, SoftAp mode pulse timing activation and deactivation instructions, signal strength activation and deactivation software, initial fingerprint (birth certificate) logarithmic and execution instructions, activation signals or software, or other instructions stored in a computer-readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, e.g., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of nonvolatile memory, media and memory devices, including by way of example semiconductor memory devices (e.g., EPROM, EEPROM, and flash memory devices); magnetic disks (e.g., internal hard disks or removable disks); magneto-optical disks; and CD ROM and DVD ROM disks. The processor and the memory can be supplemented by, or incorporated in, special purpose logic circuitry.

The present invention may be implemented as any combination of a system, a method, an integrated circuit, and a computer program on a non-transitory computer-readable recording medium. The content streaming apparatuses, gateway devices, and/or the GSM may be in the form of an access point, set-top box or other standalone device, or may be incorporated in a television or other content playing apparatus, or other device and the scope of the present invention is not intended to be limited on such forms.

The components of the content streaming apparatuses, gateway devices, and GSM may be implemented as Integrated Circuits (IC), Application-Specific Integrated Circuits (ASIC), or Large-Scale Integrated circuits (LSI), system LSI, super LSI, or ultra LSI components which perform a part or all of the functions of the GSM, and gateway devices. Each of the processing units can be many single-function components or can be one component integrated using the technologies described above. Components may also be implemented as a specifically programmed general purpose processor, CPU, a specialized microprocessor such as Digital Signal Processor that can be directed by program instructions, a Field Programmable Gate Array (FPGA) that can be programmed after manufacturing, or a reconfigurable processor. Some or all of the functions may be implemented by such a processor while some or all of the functions may be implemented by circuitry in any of the forms discussed above.

The present invention may be a non-transitory computer-readable recording medium having recorded thereon a program embodying the methods/algorithms discussed above for instructing a processor to perform the methods/algorithms.

Each of the elements of the present invention may be configured by implementing dedicated hardware or a software program controlling a processor to perform the functions of any of the components or combinations thereof. Any of the components may be implemented as a CPU or other processor reading and executing a software program from a recording medium such as a hard disk or a semiconductor memory.

It is also contemplated that the implementation of the components of the present invention can be done with any newly arising technology that may replace any of the above implementation technologies.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order unless otherwise noted, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A content streaming apparatus for steering a client device from a first wireless access point to a second wireless access point based on usage history of the client device, the apparatus comprising:
    a controller configured to establish a wireless streaming session between one or more access points and one or more client devices, an initial profile category being assigned by one or more access points to the client device based on one or more profile categories, the initial profile category including at least one of master, host, and friend; and
    a self-learning algorithm executable to: collect usage data of the client device based on the wireless streaming session, store the collected usage data, create a self-learning profile as a usage profile for the client device, and modify the initial profile category assigned to the client device based on the usage profile,
    wherein the controller provides steering instructions to steer the client device from the first wireless access point to the second wireless access point based on the usage profile and the modified initial profile category,
    the usage profile results in a newly created profile category based on a function of date and time, and
    at a later time when the client device establishes another wireless streaming session the self-learning algorithm executes to collect usage data of the client device and stores the usage data as a usage history profile, and compares the usage history profile to an initial profile to create a new usage history profile as a function of data and time.

2. The content streaming apparatus as recited by claim 1, wherein the content streaming apparatus is a home network controller.

3. The content streaming apparatus as recited by claim 1, wherein a steering app is downloaded to the client device for executing software associated with the self-learning algorithm.

4. The content streaming apparatus as recited by claim 1, wherein usage profile is determined by usage parameters that comprise a connection start time and connection end time, bandwidth for a streaming app, app settings, initial profile category, and unique device ID.

5. The content streaming apparatus as recited by claim 4, wherein the usage profile is determined based on a time period x, the time period x being determined based on the connection start time and connection end time and bandwidth used.

6. The content streaming apparatus as recited by claim 1, wherein the steering instructions are executed to the client device based on: bandwidth requirements, the usage profile, current content streaming apparatus data usage forecast for the client, and content streaming apparatus usage forecast for other clients.

7. The content streaming apparatus as recited by claim 1, wherein the client is steered to an optimal content streaming apparatus for a time period x and at the end of time period x the client is steered to another content streaming apparatus.

8. A method implemented by a content streaming apparatus for steering a client device from a first wireless access point to a second wireless access point based on usage history of the client device, comprising the steps of:
configuring a controller to establish a wireless streaming session between one or more access points and one or more client devices;
assigning, by one or more access points, an initial profile category to the client device, the initial profile category including at least one of master, host, and friend; and
executing a self-learning algorithm to: collect usage data of the client device based on the wireless streaming session, store the collected usage data, create a self-learning profile as a usage profile for the client device, and modify the initial profile category assigned to the client device based on the usage profile,
wherein the controller provides steering instructions to steer the client device from the first wireless access point to the second wireless access point based on the usage profile and the modified initial profile category,
the usage profile results in a newly created profile category based on a function of date and time, and
at a later time when the client device establishes another wireless streaming session the self-learning algorithm executes to collect usage data of the client device and stores the usage data as a usage history profile, and compares the usage history profile to an initial profile to create a new usage history profile as a function of data and time.

9. The method as recited by claim 8, wherein the content streaming apparatus is a home network controller.

10. The method as recited by claim 8, further comprising:
downloading a steering app to the client device for executing software associated with the self-learning algorithm.

11. The method as recited by claim 8, wherein the ent usage profile is determined by usage parameters that comprise a connection start time and connection end time, bandwidth for a streaming app, app settings, initial profile category, and unique device ID.

12. The method as recited by claim 8, wherein the usage profile is determined based on a time period x, the time period x being determined based on the connection start time and connection end time and bandwidth used during time period x.

13. The method as recited by claim 8, wherein the steering instructions are executed to the client device based on one or more of: bandwidth requirements, the usage profile, current content streaming apparatus data usage forecast for the client, and content streaming apparatus usage forecast for other clients.

14. The method as recited by claim 8, wherein the client is steered to an optimal content streaming apparatus for a time period x and at the end of time period x the client is steered to another content streaming apparatus.

15. One or more non-transitory computer-readable media having instructions operable to cause a content streaming apparatus to steer a client device from a first wireless access point to a second wireless access point based on usage history of the client device, comprising:
configuring a controller to establish a wireless streaming session between one or more access points and one or more client device;
assigning an initial profile category by one or more access point category to the client device, the initial profile category including at least one of master, host, and friend; and
executing a self-learning algorithm to: collect usage data of the client device based on the wireless streaming session, store the collected usage data, create a self-learning profile as a usage profile for the client device, and modify the initial profile category assigned to the client device based on the usage profile,
wherein the controller provides steering instructions to steer the client device from the first wireless access point to the second wireless access point based on the usage profile and the modified initial profile category,
the usage profile results in a newly created profile category based on a function of date and time, and
at a later time when the client device establishes another wireless streaming session the self-learning algorithm executes to collect usage data of the client device and stores the usage data as a usage history profile, and compares the usage history profile to an initial profile to create a new usage history profile as a function of data and time.

16. The computer-readable media as recited by claim 15, wherein the content streaming apparatus is a home network controller.

17. The computer-readable media as recited by claim 15, further comprising a steering app downloadable to the client device for executing software associated with the self-learning algorithm.

* * * * *